United States Patent
De Gruiter et al.

(10) Patent No.: US 12,071,675 B2
(45) Date of Patent: *Aug. 27, 2024

(54) SHAFT FURNACE CONDITION MONITORING

(71) Applicant: PAUL WURTH S.A., Luxembourg (LU)

(72) Inventors: Christian De Gruiter, Fentange (LU); Yves Heinen, Huldange (LU); Nicolas Maggioli, Thionville (FR); Paul Tockert, Berbourg (LU)

(73) Assignee: PAUL WURTH S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,600

(22) Filed: May 31, 2022

(65) Prior Publication Data

US 2022/0356539 A1 Nov. 10, 2022

Related U.S. Application Data

(63) Continuation of application No. 16/762,416, filed as application No. PCT/EP2018/080934 on Nov. 12, 2018, now Pat. No. 11,377,701.

(30) Foreign Application Priority Data

Nov. 13, 2017 (LU) ........................ 100 516

(51) Int. Cl.
*C21B 7/10* (2006.01)
*F27D 1/12* (2006.01)
(Continued)

(52) U.S. Cl.
CPC .................. *C21B 7/10* (2013.01); *F27D 1/12* (2013.01); *F27B 3/24* (2013.01);
(Continued)

(58) Field of Classification Search
CPC ..... C21B 7/10; F27B 3/24; F27D 1/12; F27D 2009/0002; F27D 2009/0048; F27D 9/00
(Continued)

(56) References Cited

U.S. PATENT DOCUMENTS

| 3,512,413 A | 5/1970 | Krusenstierna et al. |
| 3,532,797 A | 10/1970 | Lunig |

(Continued)

FOREIGN PATENT DOCUMENTS

| CN | 202688354 U | 1/2013 |
| JP | 861264110 A | 11/1986 |

(Continued)

OTHER PUBLICATIONS

JP Office Action issued Oct. 1, 2022 re: Application No. 2020-526239, pp. 1-5, citing: JP2017-527697 and D2.

(Continued)

*Primary Examiner* — Jessee R Roe
*Assistant Examiner* — Michael Aboagye
(74) *Attorney, Agent, or Firm* — CANTOR COLBURN LLP (57) ABSTRACT

A shaft furnace, in particular a blast furnace, includes a metal jacket defining the furnace outer wall and a protective layer protecting the inner surface of the outer wall. At least one condition monitoring probe is arranged inside within the protective layer to monitor the latter. The condition monitoring probe is connected to a wireless module arranged outside the outer wall to transmit condition monitoring data. The wireless module is located inside a casing mounted to the outer surface of the metal jacket. The condition monitoring probe includes one or more conductive loops positioned at predetermined depths below the front face of the cooling plate body, or of the refractory lining, so that wear (Continued)

of the body, resp. refractory, can be detected by a change of an electrical characteristic of the loop(s) due to abrasion.

9 Claims, 5 Drawing Sheets

(51) Int. Cl.
*F27B 3/24* (2006.01)
*F27D 9/00* (2006.01)

(52) U.S. Cl.
CPC .............. *F27D 2009/0013* (2013.01); *F27D 2009/0048* (2013.01); *F27D 2009/0062* (2013.01)

(58) Field of Classification Search
USPC .......... 266/44, 46, 193, 99, 194, 78; 432/77, 432/32, 36
See application file for complete search history.

(56) References Cited

U.S. PATENT DOCUMENTS

| | | | |
|---|---|---|---|
| 3,898,366 A | 8/1975 | Aurini | |
| 4,358,953 A * | 11/1982 | Horiuchi | G01K 3/14 374/137 |
| 4,412,090 A * | 10/1983 | Kawate | G01K 1/08 374/137 |
| 4,442,706 A * | 4/1984 | Kawate | C21B 7/06 266/99 |
| 4,510,793 A | 4/1985 | Ploegaert et al. | |
| 4,872,345 A | 10/1989 | Dicks | |
| 8,985,472 B2 * | 3/2015 | Peterman | F27B 7/42 236/51 |
| 9,683,783 B2 | 6/2017 | Maggioli et al. | |
| 9,963,753 B2 * | 5/2018 | Maggioli | C21B 7/10 |
| 11,377,701 B2 * | 7/2022 | De Gruiter | F27D 1/12 |

FOREIGN PATENT DOCUMENTS

| | | |
|---|---|---|
| JP | 2017527697 A | 9/2017 |
| JP | 07077389 B2 | 5/2022 |
| WO | 2013009824 A1 | 1/2013 |
| WO | 2016023838 A1 | 2/2016 |

OTHER PUBLICATIONS

English translation of Korean Office Action for Korean Application No. 10-2020-7017036, dated Apr. 3, 2023, 11 pages.
International Search Report issued Nov. 30, 2018 re: Application No. PCT/EP2018/080934, pp. 1-3, citing: WO 2013/009824 A1, US 3 532 797 A, US 3 512 413 A.
Written Opinion issued Nov. 30, 2018 re: Application No. PCT/EP2018/080934, pp. 1-7, citing: WO 2013/009824 A1, US 3 532 797 A, US 3 512 413 A.

\* cited by examiner

SHAFT FURNACE CONDITION MONITORING

CROSS-REFERENCE TO RELATED APPLICATIONS

This application is a continuation of U.S. patent application Ser. No. 16/762,416, filed on May 7, 2020, which issued as U.S. Pat. No. 11,377,701 on Jul. 5, 2022, which is the U.S. National Stage Entry of PCT Application No. PCT/EP2018/080934, filed on Nov. 12, 2018, which in turn claims priority to Luxembourg Patent Application No. 100 516, filed on Nov. 13, 2017. The entire contents of the aforementioned applications are herein expressly incorporated by reference.

TECHNICAL FIELD

The present disclosure generally relates to condition monitoring in metallurgical furnaces, namely shaft and blast furnaces. The present disclosure relates in particular to condition monitoring of cooling elements after abrasion of the protective layer in front of the cooling elements.

BACKGROUND

As it is well known, a shaft furnace works as a counter-current reactor, wherein the downward flow of charge material is in contact with an upflow of hot, carbon monoxide-rich combustion gases. The solid burden materials consisting of ferrous materials (iron ore, sinter, and pellets), coke, and fluxing materials are gravitally charged into the top of the furnace, while air normally enriched with $O_2$, and sometimes with auxiliary fuels is fed through the tuyeres near the bottom of the furnace. The liquid hot metal and liquid slag are tapped at regular intervals through a number of tapholes situated at the bottom of the furnace.

Shaft furnaces, and particularly blast furnaces (BF), are desirably operated with high productivity and low fuel rate in a flexible, stable and efficient manner, while having a long campaign life.

The blast furnace has often been referred to as 'black box'. One reason seems to be due to the difficulty of observing or monitoring what is happening inside the furnace. Indeed, in a BF three phases of gas, solid, and liquid coexist; reactions proceed non-uniformly in radial direction, the process is accompanied by a time dependent variation, and the parameters to be measured are always moving in a high temperature, high pressure, and dust containing atmosphere.

This being said, the probes and measuring devices of the BF have made a great advancement over the last decades on the basis of developments on electronics, optics and computer technology. With the use of computers, it has now become possible to monitor the different parameters of the blast furnace in a better way since computers allows not only displaying of the variables but also uses established models, compares different variables, and builds up data bases to store the variables and their evolution during the process.

The main process monitoring sensors are:
Pressure taps, which are located in the bustle pipe to monitor the blast pressure as well as at different heights in the BF to monitor the permeability of the burden and the location of the cohesive zone.
Thermocouples installed in the refractory lining at various locations (hearth and shaft) to monitor the condition of the refractory and local heat variations
Fixed-above burden probes to measure gas temperatures and determine gas patterns through the burden.
Below-burden probe inserted for monitoring the temperature and composition of the gas inside the shaft of the furnace.
Trajectory probe measures the trajectory of the burden falling from the distribution chute during the charging process.
Radial profile meter at the top measures the stockline surface profile of the burden material.
Stock movement sensors for monitoring the descent of the burden.

Hence, today, the use of sophisticated probes and measuring devices provides to the BF operator useful information on the state of the process. For the reliable operation of the BF, it is essential to collect various operating parameters by using these different sensing devices so that the BF process becomes transparent to the operator.

A modern blast furnace is thus equipped with a large number of probes, instruments and measuring devices that provide process data in continuous regime to the BF control center.

In addition to process parameters, it is required to monitor condition parameters, which reflect e.g. the wear state of furnace proper components. This is done by inspection and by means of sensors. For example, it is known to monitor the condition of cooling elements by means of ultrasound probes.

In this connection, the heart of the furnace undergoes high temperatures and a rough environment. Also, in order to protect the furnace walls and to limit heat evacuation through these walls, the furnace interior wall is equipped with a lining of refractory material. In modern furnaces, the refractory material is mounted on cooling elements referred to as cooling staves.

Originally, such cooling elements have been cast iron plates with cooling pipes cast therein. As an alternative to cast iron staves, copper staves have been developed. Nowadays, cooling elements for a metallurgical furnace are thus also made of copper, a copper alloy or, more recently, of steel.

The refractory brick lining, the refractory guniting material or the process generated accretion layer forms a protective layer arranged in front of the hot face of the panel-like body. This protecting layer is useful in protecting the cooling element from deterioration caused by the harsh environment reigning inside the furnace.

Depending on the conditions of operation of the BF by the operator, the protective layer may wear out mainly due to rubbing of the descending burden (coke, ore, etc.). In practice, the furnace is however also occasionally operated without this protective layer, resulting in erosion of the lamellar ribs of the hot face.

To anticipate a maintenance operation it is therefore useful to monitor the condition, i.e. the wear, of the cooling elements. Due to the harsh conditions described above, it is not yet conceivable to mount a sophisticated device inside the furnace. For the same reason and because there is constantly material inside the furnace, it may not be possible to visually check the state of the cooling elements.

Solutions have already been proposed in the art. For example, document JPS61264110 discloses a cooling stave comprising a condition monitoring system using an ultrasonic probe in contact with the rear face of the stave body to detect erosion thereof. This appears as a cumbersome technique to be implemented in the blast furnace environment.

Another document WO 2016/023838 discloses a cooling stave comprising a condition monitoring system. The stave comprises a plurality of closed pressure chambers distributed at different locations within the stave body. A pressure sensor is associated with each pressure chamber in order to detect a deviation from a reference pressure when a pressure becomes open due to wear out of the body portion. While the solution described in this document is technically satisfactory, it requires some workshop preparation, which may add on costs.

WO 2013/009824 discloses a stave/brick construction wherein wear monitors and/or thermocouples are disposed through or adjacent to the stave and/or one or more of the bricks. Data transmitting cables are attached to the thermocouple and the wear monitor system ends for transmission to a control center so that data readings can be continuously transmitted "real time" during furnace operation. The wear monitoring technology is rather complex as it relies on time-domain reflectometry.

Also disclosed in WO 2013/009824 is a laser scanning and mapping system to automatically scan and map the interior of the furnace and track the internal condition of staves and refractory bricks. The mapping system uses energy waves such as laser light waves from a emitter/receiver unit. In order to perform such mapping, it will be understood that such specific equipment can be used in the blast furnace in the rare situation where the blast furnace is shut down and the charge has been lowered.

U.S. Pat. No. 3,532,797 discloses the use of conductive loops to detect wear of refractory lining. Each loop is accommodated in a respective tube of aluminum oxide and the tubes are bundled into a generally cylindrical bundle, in a staggered manner. The conductor loops are formed of a wire having a melting point in the neighborhood of the furnace lining, so that the loops melt when the lining liquefies or melt. The staggered arrangement of the conductive loops allows detecting wear at several depths. However the sensor design and installation is rather experimental and cumbersome.

An object of the present disclosure is to improve the condition monitoring in shaft furnaces.

A particular object of the disclosure is to improve condition monitoring of cooling elements, namely their wear condition.

SUMMARY

The present disclosure is derived from considerations regarding shaft and blast furnace condition monitoring. As discussed above, a number of sensors and probes are arranged in the BF to monitor process parameters such as pressures, temperatures, burden distribution. These provide process data in continuous regime to the BF control center, which are required for efficient and reliable running of the blast furnace.

The installation of these process monitoring probes and sensors is time consuming and represents a substantial amount of work. Since the sensors are required to provide continuous data for the BF operation, it is not only required to install the sensors inside the furnace, but also to run cables through the furnace outer shell up to the control center.

Wiring is again at issue during maintenance shut-down of the BF, in particular when restoring the refractory layer or replacing cooling staves.

In the context of condition monitoring, the present inventors propose the use of wireless transmission of sensor data, instead of wired transmission. The use of wireless transmission in the context of the shaft furnaces may at first sight seem inappropriate: there are many metal structures surrounding the wireless module and the operating conditions are harsh (temperature/dust/barrier of the furnace shell). Also, the replacement of batteries during furnace operation may be an issue.

However, the use of wireless transmission does make sense for transmitting data from condition monitoring sensors. Contrary to process parameters that are continuously required for the furnace operation, condition parameters such as e.g. the wear status of the refractory lining or of cooling elements, do not require such continuous monitoring. Condition parameters can be checked selectively, or periodically on a time basis ranging between several hours to several days. In practice, condition parameters may be checked every few hours or once a day. This short daily operating time preserves battery time and allows for weeks/months of service, so that battery replacement is likely to be not required between shut-down periods.

Last but not least, the use of wireless modules for transmitting the data of condition monitoring sensors and probes will avoid time-consuming and cumbersome wiring operations, and hence significantly reduce the shaft furnace shut-down time.

According to a first aspect, the present disclosure proposes a shaft furnace, in particular a shaft furnace, comprising:
- a metal jacket defining the furnace outer wall;
- a protective layer protecting (at least partially) the inner surface of said outer wall;
- at least one condition monitoring probe arranged inside said outer wall and within the protective layer to monitor the latter;
- wherein the at least one condition monitoring probe is connected to a detection module (34) operatively connected to a wireless module, which are battery powered and arranged outside the outer wall to transmit condition monitoring data;
- wherein said outer wall comprises an aperture for wired connection between condition monitoring probe(s) and the wireless module, a casing being mounted to the outer surface of said metal jacket in a gas-tight manner to cover the aperture.

As apparent from the above-cited prior art, the common wisdom in the art is to use wired wear monitoring sensors and process monitoring sensors (thermocouples). The present disclosure thus overcomes a technical prejudice by using wireless modules for condition monitoring probes.

The disclosure resides in the insight that battery operated wireless modules are viable to transmit data from condition/wear sensors, because the measurement frequency is low compared to process monitoring sensors, and since their readings are not required for production purposes.

The use of wears probes combined with wireless modules greatly simplifies the installation of wear sensors, and in particular when retrofitting existing Blast Furnaces. As it will be understood, it is sufficient to take advantage of an aperture in the furnace shell to draw the sensor wire outside and connect to the detection/wireless module.

The use of wireless modules for transmitting the data of condition monitoring sensors and probes will avoid time-consuming, cumbersome and cost-intensive wiring operations, and hence significantly reduce the shaft furnace shut-down time. In embodiments, the detection module is configured to evaluate the condition by means of said the condition monitoring probe(s) at predetermined time intervals but no more than once or twice a day.

Advantageously, the wireless module, detection module and battery are located inside the casing. For improved communication, the antenna of the wireless module may extend outside the casing. The detection—wireless module is thus protected from harsh environment of the BF, but accessible from time to time by opening the casing. Despite the fact that the detection—wireless module is located in a closed metallic casing, the wireless transmission is enabled since the antenna is guided outside the casing.

In embodiments, the casing comprises a steel pipe piece, one end of which is positioned to surround the aperture in the metal jacket and is welded to the outer surface of said metal jacket; the opposite end of the pipe piece being tightly closed by a cover.

In general, the protective layer may comprise cooling elements and/or refractory lining. The condition monitoring probes can be embedded within the cooling elements and/or the refractory lining. The term "cooling element" is used herein to encompass any cooling device that may be used in a shaft or blast furnace proper, including the well-known cooling plates and cooling staves.

Condition monitoring of the cooling elements is advantageously achieved by means of the design recited in claim 7. The condition monitoring probe includes one or more conductive loops positioned at predetermined depths below the front face of the cooling plate body, each loop being connected to a pair of terminals on the rear face of the body, so that wear of the conductive loops the can be detected by a change of an electrical characteristic of the loop(s) due to abrasion. This design of condition monitoring probe may also be referred to as wear detection probe.

A condition monitoring probe with such conductive loops can be evaluated by a detection module connected to the terminals based on a variety of electrical principles: change of voltage, current or resistance.

Preferably the detection module is configured to evaluate an electrical closed circuit condition of each conductive loop. Such evaluation can be easily implemented since it does not require prior calibration and is not subject to temperature variations.

The above and other embodiments are recited in the appended dependent claims.

According to another aspect, the present disclosure concerns a cooling plate for a metallurgical furnace or shaft furnace as recited in claim 10. It comprises a body with a front face and an opposite rear face, wherein in use said front face is turned towards the furnace interior. The body includes at least one coolant channel therein, for circulating a coolant fluid, e.g. water. The front side preferably comprises alternating ribs and grooves.

It shall be appreciated that at least one wear detection probe is embedded in the body to detect wear thereof. The wear detection probe includes a plurality of conductive loops positioned at predetermined depths below the front face of said body and are electrically insulated therefrom, each loop being connected to a pair of terminals on the rear face of the body, so that wear of the body can be detected by a change of an electrical characteristic of a the loop(s) due to abrasion. The cooling plate is further characterized in that:

The conductive loops are formed as conductive lines on a board;
    each conductive loop describes a generally U-shape, and the loops are nested within one another;
The conductive loops generally extend from the rear side in a thickness direction of the body so that an end section, forming a wearable section, of each loop is located at the predetermined distance (d1, d2, d3) from the front face;
    the probe is arranged in a through bore or blind bore in said body;
    the probe comprises a cylindrical housing surrounding said board with the conductive loops, the cylindrical housing having a shape matching the shape of the bore; and
    the cylindrical housing is made from the same material as the cooling plate body.

Other embodiments of this cooling plate are recited in the appended claims 11 to 14.

According to a further aspect, the disclosure concerns a wear detection probe as recited in claim 15.

BRIEF DESCRIPTION OF THE DRAWINGS

The present disclosure will now be described, by way of example, with reference to the accompanying drawings, in which.

DETAILED DESCRIPTION OF THE DRAWINGS

As discussed hereinbefore, the modern operation of the blast furnace is typically based on process data obtained by process monitoring sensors and probes arranged at various locations in the furnace.

In addition to process monitoring, condition monitoring sensors are required to evaluate the wear state of BF components. In the context of the present disclosure, condition monitoring in the BF will now be described with respect to an application concerning wear detection in cooling elements, namely in cooling plates. The installation and design of a wear detection probe will first be described, followed by the operational coupling to a wireless module for transmitting the data to e.g. a control center or to a data storage and/or processing system, either on the plant site or in the cloud.

Figure 1:
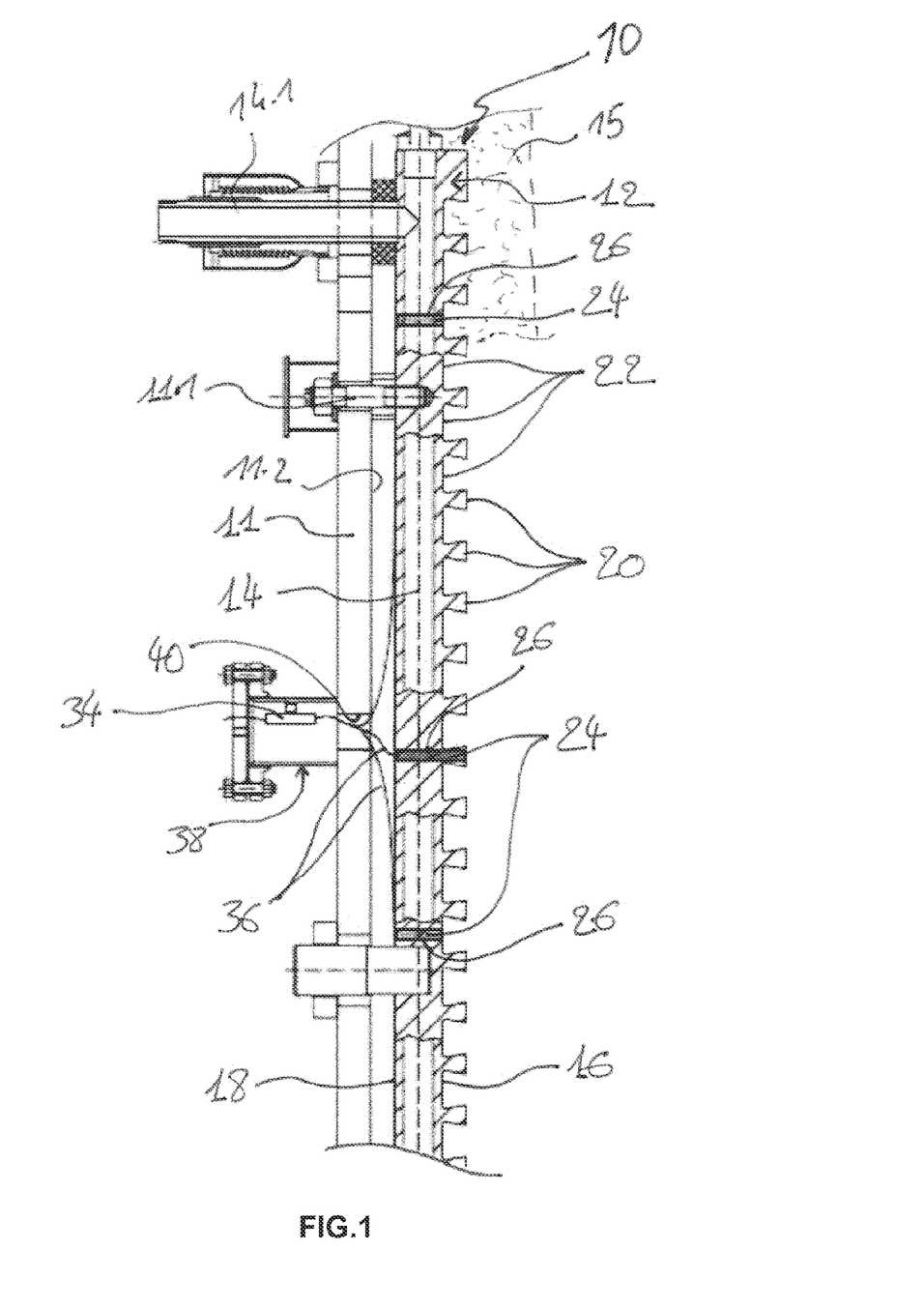
FIG. 1: is a cross-section view of an embodiment of the present cooling plate equipped with condition monitoring sensors, mounted against a blast furnace outer wall.

A preferred embodiment of a cooling plate 10 equipped for condition monitoring is shown in FIG. 1. The cooling plate 10 is mounted on the outer wall 11 (or shell) of a blast furnace. Such outer wall is conventionally formed by an upright metal jacket, typically steel, (only shown in part) that is provided on its inner surface 11.2 with a refractory lining covering the outer wall and bottom (in FIG. 1, for the sake of clarity, only part of the refractory lining is shown and designated 15). The cooling plates are arranged in between the shell wall 11 and the refractory lining 15 for cooling purposes; they are fixed by anchoring means 11.1.

FIG. 1 only shows a part of the cooling plate 10. As it is known in the art, the cooling plate 10 comprises a body 12 that is typically formed from a slab i.e. made of a cast or forged body of copper, copper alloy, cast iron or steel. The body 12 has at least one conventional coolant channel 14 embedded therein, in order to provide a heat evacuating protection screen between the interior of the furnace 11.2 and the furnace wall 11. Coolant fluid (typically water) is circulated into the coolant channels 14 via appropriate connectors 14.1 arranged through the wall 11.

The body 12 has a front face 16, which is turned towards the furnace interior, and an opposite rear face 18, which in use faces the furnace wall 11.

As shown in FIG. 1, the front face 16 of the body 12 advantageously has a structured surface, in particular with alternating lamellar ribs 20 and grooves 22. When the cooling plate 10 is mounted in the furnace, the grooves 22 and ribs 20 are generally arranged horizontally in order to provide an anchoring means for the refractory brick lining.

During the course of operation of the blast furnace, the refractory brick lining erodes due to the descending burden material, leaving the cooling plates unprotected and facing the harsh environment inside the blast furnace.

As a result, depending on conditions of operation of the BF, abrasion of the cooling plates can occur and it is desirable to monitor the wear status of the cooling plates.

To monitor the condition of such cooling plates, a plurality of wear detection probes are embedded therein.

Accordingly, in this embodiment the body 12 comprises a plurality of through bores 26 that are drilled in a direction perpendicular to the front face 16 of the body 12. The diameter of the bores 26 is dimensioned to receive the wear detection probes 24 therein.

Figure 2:
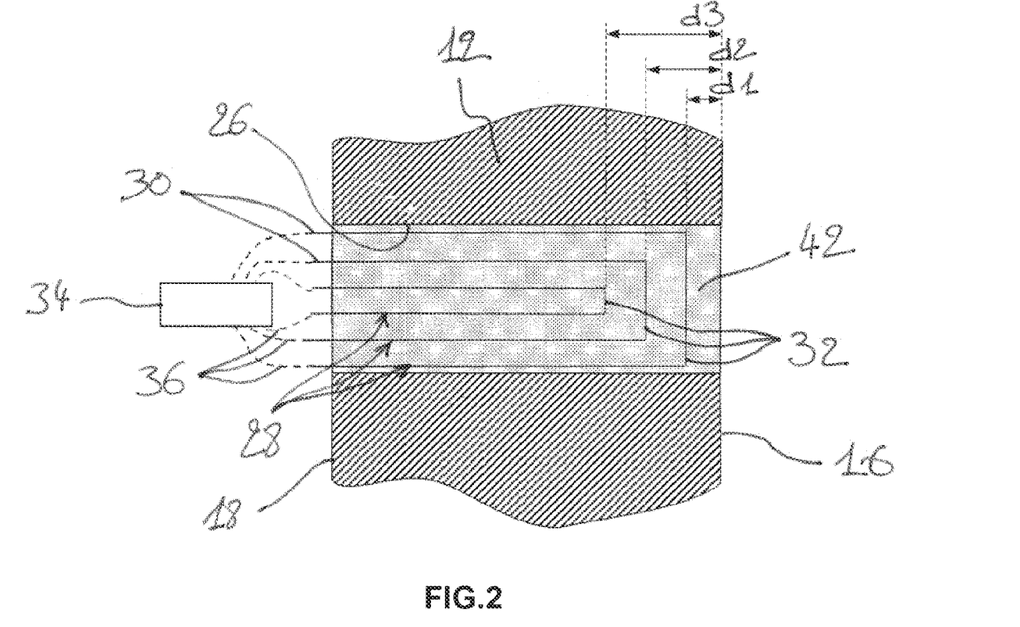
FIG. 2: is a schematic view of a wear detection probe embedded in a non-used cooling plate.
Figure 3:
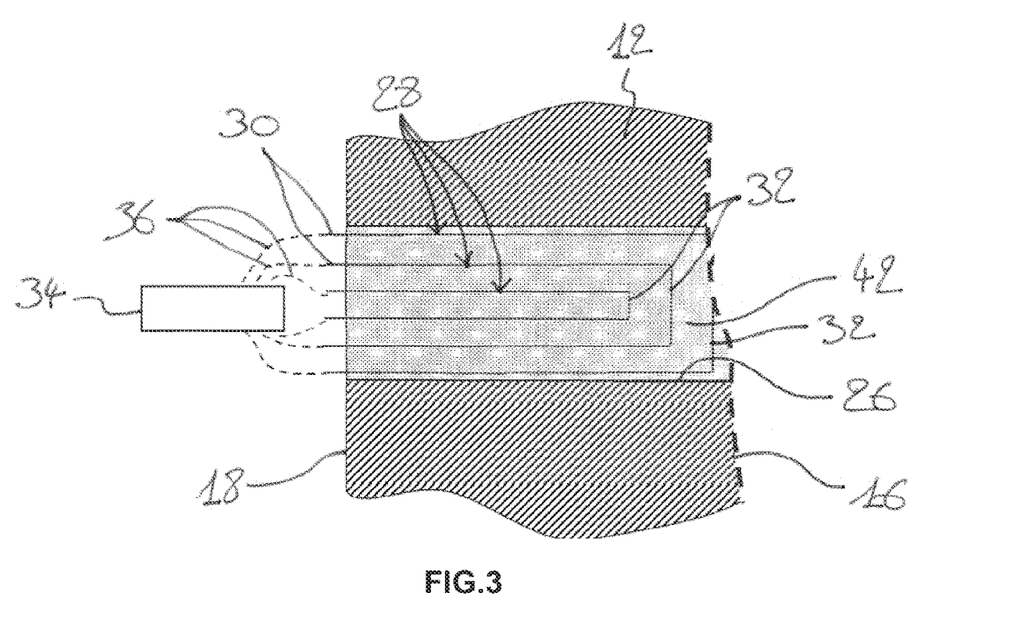
FIG. 3: is a schematic view of a wear detection probe embedded in a partly worn cooling plate.

The design of the wear detection probe 24 will be better understood from the schematic views of FIGS. 2 and 3, which correspond to a non-used cooling plate state and a partially worn cooling plate state, respectively.

The probe 24 comprises a number of conductive loops 28, here three.

Each conductive loop 28 is connected to a pair of terminals 30 disposed, in use, on the rear face 18 of the body 12. Each conductive loop 28 extends generally in the thickness direction of the body to reach a predetermined depth below the front face 16. More specifically, the end section of each loop 28 is located at a respective predetermined distance d1, d2, d3, to the front face 16. Such end section forms a wearable section 32 designed to be altered and/or eliminated by abrasion as the front face of the cooling plate wears out. In practice, the conductive loops 28 are combined with a support board or plate, separated and insulated from each other.

The overall shape of the conductive loops 28 is not a critical feature of the wear detection probe 24 as long as the wearable sections 32 reach the respective predetermined distances to the front face 16. In the embodiment of FIG. 2, the loops 28 have a U shape with two parallel lines extending from the terminals 30 on the rear face 18, reunited by a transverse, third line forming the wearable section 32 at a given distance to the front face 16. The three loops 28 are laid on a carrier board 42, are nested within one another, and isolated from each other.

Such a probe having conductive loops on a carrier board 42 can e.g. be easily manufactured as a printed circuit board.

In FIG. 2, the cooling plate 10 is not worn. The probe 24 extends between the front face 16 and the rear face 18 of the cooling plate 10.

In operation, material inside the furnace hits and rubs against the cooling plates 10; the high abrasion effect rips out bits of the cooling plates. Signs of wear appear on cooling plate body 12 as shown by the dashed line in FIG. 3. The wear detection probe 24 gets worn together with the body 12 of the plate 10. When the wear profile reaches down to the depth corresponding to the distance d1, the wearable section of the outer conductive loop 32 is interrupted and no current is able to circulate therein.

As wear progresses it reaches the wearable sections of other conductive loops (d2 and then d3), with the wearable sections being interrupted only if the cooling plate is worn away at their particular location.

By checking the integrity of all of the conductive loops 28, it is then possible to deduce the residual thickness of the cooling plate (knowing the positions d1, d2 etc. of the different conductive loops).

The terminals 30 of the loops 28 may be connected to a detection module 34 via wires 36. In embodiments, the detection module may be directly connected to the terminals, or there may be other components between the detection module and the terminals.

The detection module 34 is advantageously configured to evaluate an electrical closed circuit condition of each loop 28. If a conductive loop 28 verifies the closed circuit condition, then current applied at the respective terminals can circulate therethrough. This confirms the integrity of the circuit. It can thus be deduced that the cooling plate is not damaged or worn at the corresponding depth.

The detection module 34 can be configured to perform the evaluation for the respective conductive loops at predetermined time intervals, e.g. every few hours or preferably once a day to save on energy.

The detection module 34 is installed on the rear face of the cooling plate or further away from it, as will be discussed further below. In FIG. 1 the detection module 34 is accommodated in a sealed casing 38 outside of the furnace wall 11. The detection module 34 is here connected to three probes 24 via wires 36 passing through an aperture in the furnace wall 11.

Figure 5:
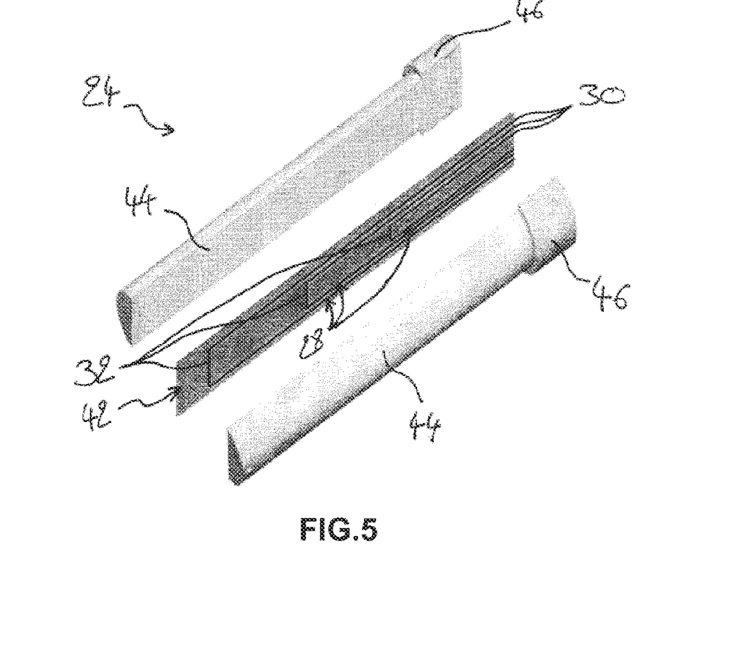
FIG. 5: is an exploded view of the wear detection probe of FIG. 1.

Turning now to FIG. 5, a possible design of the wear detection probe 24 used in FIG. 1 is shown. As indicated above, the conductive loops 28 are typically supported by a substantially rigid carrier, such as a board 42 or plate. It can be readily manufactured using printed circuit technology, e.g. by wet or dry etching of a copper plated board. The board 42 may be made from epoxy resin or other appropriate material. Printing technology can also be used to form the conductive loops/tracks. The exposed surface of conductive tracks can be insulated by coating with an electrically insulating material (applied by spraying, painting or laminating). Where desirable, multilayer structures can be manufactured, where different conductive loops are built on top of another.

These are only examples; any appropriate technology may be used to form conductive tracks on a carrier board.

As will be understood from FIG. 5, the wear detection probe 24 advantageously comprises a cylindrical housing surrounding the circuit board 42. The cylindrical housing has an outer shape matching the shape of the bore 26 in the body 12.

The cylindrical housing comprises two half-cylinder parts 44 between which the circuit board 42 is sandwiched. The two half-cylinder parts 44 are pressed together clamping the circuit board 42 in the middle so as to form a cylinder shape fitting inside bore 26. The two half-cylinder parts 44 may be held together using any suitable fixing means for example screws or glue, not shown. Screwing or gluing is however not necessary. It may be sufficient to simply assemble the two cylindrical parts with the circuit board in-between, and introduce it into the bore of the cooling plate body. In embodiments, a layer of thermally conductive paste can e.g. be provided at the interfaces housing part/circuit board.

In order to ensure a good cooling and not to influence the wear pattern, the housing parts 44 are preferably made from the same material as the cooling plate body 12. The housing parts 44 may namely be made from copper or copper alloy. In general, the housing parts may be made from materials that will exhibit same or comparable wear behavior/speed. Material harder than the material of the body are preferably avoided. Softer materials can be used where the bore 26 is rather narrow.

For positioning purposes, each half-cylinder part 44 may comprise a shoulder 46 at the end situated on the rear of the body 12 (same end as the terminals 30). The shoulders 46 forms a section of larger diameter, which comes into abutment against a complementary radial surface 48 (FIG. 4) in an inlet section 48 of the mounting bore 26 provided in body 12. The shoulders 46 and the abutment surface 48 define position of the probe 24 in the thickness direction of the body 12.

Figure 4:
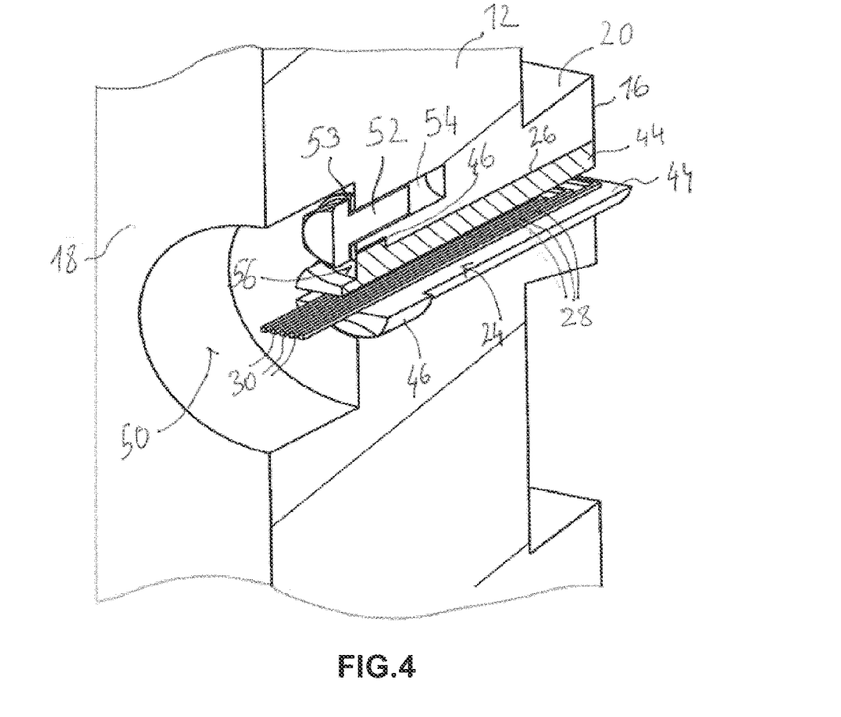
FIG. 4: is a cross-section perspective view illustrating the mounting of a wear detection probe with modified housing.

It may be noted that in FIG. 4, the rear face 18 comprises a recess 50 in which the hole 26 is drilled. This recess 50 provides room for accommodating, e.g., a detection module or other component. Such a recess 50 is not required and is in fact omitted in the embodiment of FIG. 1, where the terminals 30 are substantially aligned with the rear face of the body 12.

Still on FIG. 4, an optional locking means is illustrated, which comprises a screw 52 and a washer 53 inserted inside a threaded hole 54 next to the probe 24. The free end of the larger section is machined to provide one or two axially extending flats, revealing respective radial surfaces 56. As illustrated in FIG. 4, upon installation, the washer 53 (and possibly the screw head) overlaps with the radial surface 56, blocking the probe 24 in place. By way of this design, screw 52 prevents axial and rotational movement of the probe housing 24.

Figure 6:
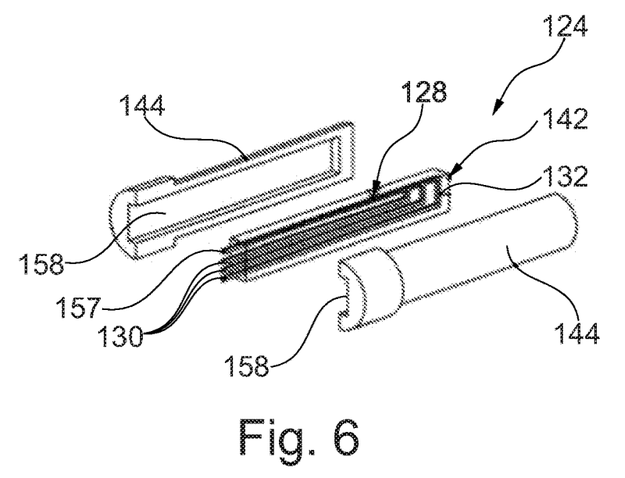
FIG. 6: is an exploded view of another embodiment of the wear detection probe.

An alternative design of the wear detection probe, indicated 124, is shown in FIG. 6. Identical or similar elements are indicated by same reference signs, augmented by 100. Compared to probe 24, a first difference resides in the laying of the conductive lines. The printed circuit board 142 comprises a predetermined number of U-shaped conductive loops 128, namely three, nested within one another. Conductive loops 128 are not electrically independent, but share a same ground terminal 157, reducing the total number of terminals 130.

Another difference is that the half-cylinder parts 144 comprise an axially extending recess 158, opening at the terminal end, dimensioned to accommodate the circuit board 142.

In the above embodiments, the wear detection probe 24, 124 is shown to extend over the entire thickness of the body 12, thus being mounted in a through bore 26. But the wear detection probe may have a shorter length and be inserted in a blind bore.

In other embodiments, not shown, the wear detection probe can be arranged in the cooling plate body without housing, but cast in a filling material. For example, a blind bore may be drilled from the rear face of the cooling plate, and subsequently filled with a filling material, e.g. concrete. The wear detection probe consisting of the board carrying the conductive loops is then introduced into the blind bore.

In such embodiment, the board is preferably positioned to be, in use, in a vertical plane. In contrast, when the board 42 with conductive loops is provided in a housing, as in FIG. 4, the probe is preferably oriented so that the board 42 lies, in use, in a horizontal plane.

Let us now address the wiring of the probes 24. As explained above, a plurality of probes 24 are typically embedded in a cooling plate 12, at various locations, either corresponding to a groove or to a rib (see e.g. FIG. 1). The evaluation of the integrity of the loops 28 is typically carried out by a detection module 34 separate from the probe itself. A detection module 34 can be associated to one or more probes, depending on the choice of technology. The detection module 34 typically includes an acquisition card having a certain number of I/O terminals, which determines the number of connections to conductive loops. The detection module preferably includes a processor unit configured to perform the evaluation of each conductive loop 28. However, this is not required and the detection module could simply serve as interface, the evaluation being made at the BF control center.

In the embodiment of FIG. 1, the probes 24 of a same cooling plate are wired to a common detection module 34 (wires 35 run from the respective probes to the detection module 34). The detection module 34 itself is located in casing 38 outside the furnace shell 11. This is illustrated in more detail in FIG. 7.

Figure 7:
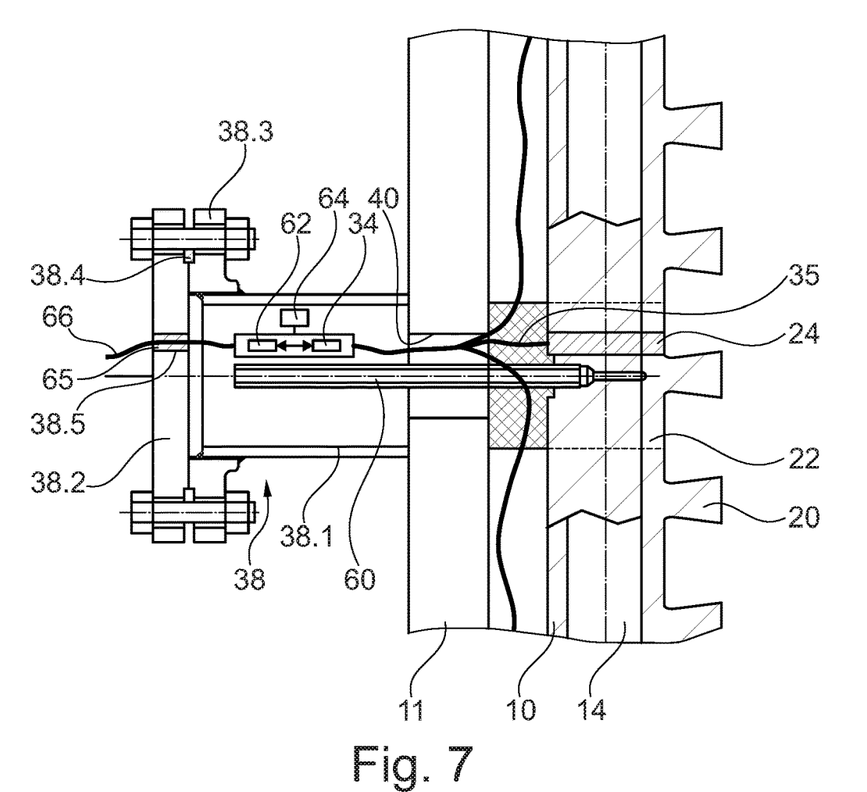
FIG. 7: is a detail of FIG. 1 about the casing hosting the detection module.

Casing 38 comprises a steel pipe piece 38.1, one end of which is positioned to surround aperture 40 in metallic jacket 11 and is welded in an air-tight manner to the outer surface of the metal jacket 11. The opposite end of pipe piece 38.1 is tightly closed by a cover 38.2. Here, cover 38.2 is screwed to a radial flange 38.3 welded to pipe piece 38.1. An annular gasket 38.4 is interposed between facing surfaces of the cover and flange. Casing 38 thus provides an access port into the furnace via aperture, but is sealably closed when the BF is under operation to avoid pressure leaks.

It may be noted that such casing 38 is known in the art, in particular for accessing thermocouples. Reference sign 60 in FIG. 7 designates a thermocouple conventionally fitted into the rear side of the cooling plate to monitor its temperature. The thermocouple extends into the casing, to facilitate its manipulation and replacement, when needed.

It shall be remarked that detection module 34 is operatively connected to a wireless module 62 in order to transmit to the BF control center condition data about the cooling plate 12, as determined by the wear detection probes 24. The detection module 34 and wireless module 62 are powered by a battery 64. The antenna 66 of the wireless module is preferably passed through casing 38 to extend outside the casing 38 (and furnace wall 11). In the shown embodiment, a stuffing box 65 is provided in a bore 38.5 in cover 38.2 and the antenna 66 is guided through said bore 38.5. The wire (not shown) of the thermocouple 60 also typically passes through this bore 38.5.

The disclosure here takes advantage of existing access ports, i.e. casings 38, on the BF shell to install condition monitoring probes. The detection module 34 is installed in the casing 38, outside the furnace wall and wires 36 can be conveniently passed through aperture 40.

The use of a wireless module 62 avoids lengthy and expensive wiring information to connect the individual detection modules 34 with the control center. This provides a significant advantage by reducing the maintenance downtime of the furnace.

The wireless module 62 can be based on any appropriate wireless technology/standards, for example WIFI, Bluetooth, 3G, 4G, LTE, Laura, etc.

Contrary to process monitoring probes, the use of battery powered modules makes sense here for condition monitoring, since no continuous feed is required. The detection module is programmed to evaluate the condition/wear of the cooling plate once or twice per day. This low on-time of the wear detection probes permits long operation on batteries. The battery can be based on any appropriate technology.

Figure 8:
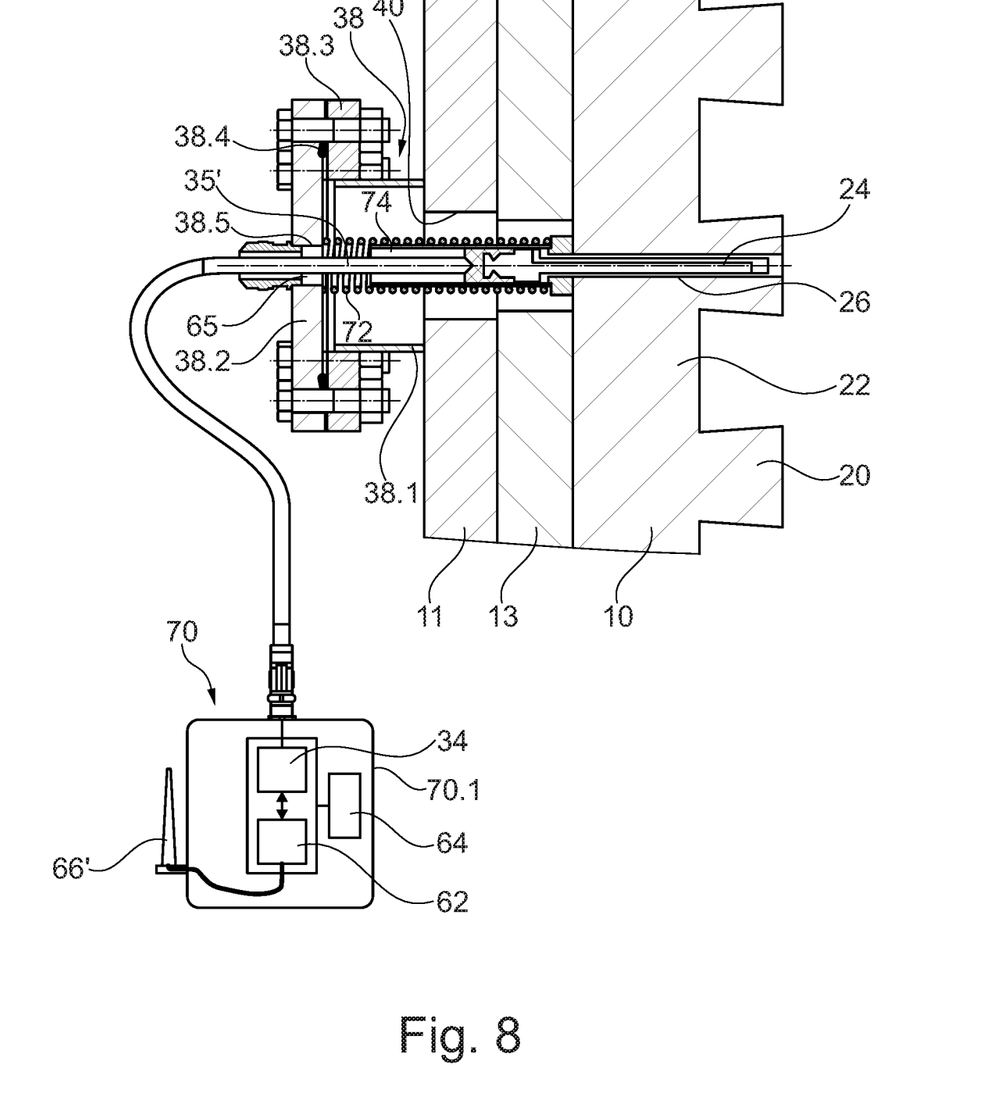
FIG. 8: is a cross-section view of a cooling plate retrofitted with the present wear detection probe.

Turning finally to FIG. 8, there is shown an embodiment illustrating the efficiency of the disclosure for retrofitting existing blast furnaces. Same reference signs illustrate identical or similar elements as in FIG. 7. In order to monitor the wear of a cooling plate 10, it suffices to drill an opening 40 in the furnace shell 11 and through the insulating layer 13 in between the shell 11 and cooling plate 10. Then a through hole 26 is drilled in the cooling plate body in its thickness direction, from the rear side to the front side. Obviously the through hole is drilled at a known location to avoid opening an internal cooling channel. One will recognize also here the casing 38 that provides a sealable access port to opening 40.

A wear probe 24 as presented in FIG. 7 and 6 is then inserted in the though hole. The inner diameter of the through hole 26 and the outer diameter of probe 24 are adapted so that they fit with a small play. A wire 35' connected at one end to the PCB of the probe is drawn through opening 40 and through the wall of the casing 38. Here, wire 35' passes through a hole 38.5 in cover 38.2, which is sealed by a stuffing box 65.

It may be noted that the probe 24 is maintained in place by a compression spring 72 aligned with the probe 24 axis and bearing at one end on the rear side of the probe housing, and at the other end on the inner side of cover 38.2. This ensures that the probe 24 remains fully inserted in the bore, so that the ends of the conductive loops are at a known position. Compared to other fixing means such as screws, the use of a spring 72 has the advantage that it does not require further machining or preparation of the cooling plate. A guide sleeve 74 can be inserted in the spring 72, if desired, on part of the distance covered by the latter.

Wire 35' is connected, outside of the furnace, to a unit 70 comprising the detection module 34, wireless module 62 and battery 64, arranged in a metallic housing 70.1. The wireless module 62 is connected to an antenna 66' outside of the housing 70.1.

The invention claimed is:

1. A shaft furnace comprising:
   a metal jacket defining the furnace outer wall;
   a protective layer protecting an inner surface of said outer wall;
   at least one condition monitoring probe arranged inside said outer wall and within said protective layer to monitor the latter;
   wherein said at least one condition monitoring probe is connected to a detection module operatively connected to a wireless module, which are battery powered and arranged outside said outer wall to transmit condition monitoring data; and
   wherein said outer wall comprises an aperture for wired connection between said at least one condition monitoring probe and said wireless module, a casing being mounted to the outer surface of said metal jacket in a gas-tight manner to cover said aperture.

2. The shaft furnace according to claim 1, wherein said detection module is configured to evaluate the condition by means of said at least one condition monitoring probe at predetermined time intervals but no more than once or twice a day.

3. The shaft furnace according to claim 1, wherein said wireless module, said detection module and said battery are located inside said casing; and an antenna of said wireless module extends outside said casing.

4. The shaft furnace according to claim 1, wherein said casing comprises a steel pipe piece, one end of which is positioned to surround said aperture and is welded to the outer surface of said metal jacket; the opposite end of said pipe piece being tightly closed by a cover.

5. The shaft furnace according to claim 1, wherein said protective layer comprises cooling elements and/or refractory lining; and condition monitoring probes are embedded within said cooling elements and/or said refractory lining.

6. The shaft furnace according to claim 5, wherein said cooling elements are fixed against the inner surface of the outer wall and the condition monitoring probes are embedded in a body of the cooling elements.

7. The shaft furnace according to claim 6, wherein the condition monitoring probe includes a plurality of conductive loops positioned at predetermined depths below a front face of said body and are electrically insulated therefrom, each loop being connected to a pair of terminals on a rear face of said body, so that wear of said body can be detected by a change of an electrical characteristic of a said loop(s) due to abrasion; wherein
   said conductive loops are formed as conductive lines on a board;
   each conductive loop describes a generally U-shape, and the loops are nested within one another,
   said conductive loops generally extend from the rear side in a thickness direction of said body so that an end section, forming a wearable section, of each loop is located at said predetermined distance from said front face;
   said probe is arranged in a through bore or blind bore in said body;
   said probe comprises a cylindrical housing surrounding said board with said conductive loops, said cylindrical housing having a shape matching a shape of said bore; and
   said cylindrical housing is made from the same material as a body of said cooling element.

8. The shaft furnace according to claim 7, wherein said detection module is connected to said terminals and configured to evaluate said electrical characteristic of each loop, said electrical characteristic being one of a voltage, current or resistance of each loop.

9. The shaft furnace according to claim 8, wherein said detection module is configured to evaluate an electrical closed circuit condition of each conductive loop based on resistance measurement.

* * * * *